United States Patent [19]

Cass

[11] Patent Number: 5,585,041
[45] Date of Patent: Dec. 17, 1996

[54] ELECTRICALLY-CONDUCTIVE TITANIUM SUBOXIDES

[76] Inventor: Richard B. Cass, R. D. 1, Box 545, Ringoes, N.J. 08551

[21] Appl. No.: 476,228

[22] Filed: Jun. 7, 1995

Related U.S. Application Data

[62] Division of Ser. No. 239,943, May 9, 1994, which is a continuation of Ser. No. 531,208, May 30, 1990, abandoned, which is a division of Ser. No. 6,119, Jan. 23, 1987, Pat. No. 4,931,213.

[51] Int. Cl.$^6$ ............................. H01B 1/08; H01B 1/16
[52] U.S. Cl. ............................. 252/520; 445/49; 445/67
[58] Field of Search ........................... 252/520; 445/49, 445/67

[56] References Cited

U.S. PATENT DOCUMENTS

| | | | |
|---|---|---|---|
| 1,675,117 | 6/1928 | Lubowsky | 252/510 |
| 2,369,266 | 2/1945 | Thurnauer | 242/257 |
| 3,409,563 | 11/1968 | Olstowski | 252/506 |
| 3,856,567 | 12/1974 | Pitala et al. | 717/221 |
| 3,956,194 | 5/1976 | Armand | 252/507 |
| 3,962,133 | 6/1976 | Rodewald | 252/433 |
| 4,029,566 | 6/1977 | Brondmair et al. | 204/290 |
| 4,052,539 | 10/1977 | Shropshire et al. | 429/194 |
| 4,110,252 | 8/1978 | Smith et al. | 252/422 |
| 4,119,655 | 10/1978 | Hulme | 260/440 |
| 4,252,629 | 2/1981 | Bewer et al. | 204/290 |
| 4,293,450 | 10/1981 | Vogel | 252/503 |
| 4,414,142 | 11/1983 | Vogel et al. | 252/506 |
| 4,422,917 | 12/1983 | Hayfield | 204/196 |
| 4,465,581 | 8/1984 | Juel et al. | 204/290 |
| 4,472,258 | 9/1984 | Secrist et al. | 204/292 |
| 4,474,614 | 10/1984 | Arentzen | 204/292 |
| 4,477,374 | 10/1984 | Watanabe et al. | 252/508 |
| 4,483,785 | 11/1954 | Johnson | 251/520 |
| 4,496,530 | 1/1985 | McGuiggan | 423/416 |
| 4,511,493 | 4/1985 | Watanabe et al. | 252/507 |
| 4,515,709 | 5/1985 | Watanabe et al. | 252/509 |
| 4,565,649 | 1/1986 | Vogel | 252/503 |

FOREIGN PATENT DOCUMENTS

| | | |
|---|---|---|
| 61-106414 | 5/1986 | Japan . |
| 0232680 | 4/1925 | United Kingdom . |
| 1231280 | 5/1971 | United Kingdom . |
| 1438462 | 6/1976 | United Kingdom . |

OTHER PUBLICATIONS

Intercal Technical Bulletin, No. 3, "Solvent Compatibility", Apr. 10, 1985.
Intercal Technical Bulletin, No. 5, "Intercalated Graphite Powder DP 26001", Apr. 4, 1985.
Intercal Technical Bulletin, No. 7, "Intercalated Graphite Powder DP 36001", Apr. 4, 1985.
Intercal Technical Bulletin, No. 8, "Intercalated Graphite Powder DP 26011", Apr. 4, 1985.
Intercal Technical Bulletin, No. 9, "Intercalated Graphite Powder DP 12001", Apr. 4, 1985.
Intercal Technical Bulletin, No. 10, "Intercalated Graphite Powder DP 13001", Apr. 4, 1985.
Intercal Technical Bulletin, No. 12, "Intercalated Chopped Graphite Fiber EP C1001", Apr. 10, 1985.
Intercal Technical Bulletin, No. 13, "Intercalated Graphite Powder Ep 26030", Apr. 5, 1985.
Intercal Technical Bulletin, No. 14, "Product Information", Apr. 3, 1985.
Y. Iye, "Superconductivity in Graphite Intercalation Compounds", Materials Research Society Symposia Proceedings, Intercalated Graphite, M. S. Dresselhaus et al editors, Nov. 1982, vol. 20, pp. 185–193.
M. G. Harwood, "Electrical Conductivity of Rutile–Part 5–Influence of Protons, Manganese and Niobium", pp. 213–227.
F. A. Cotton and G. Wilkinson, Advanced Inorganic Chemistry—A Comprehensive Text, Third Edition, Interscience Publishers (1972), pp. 807–818.
Comprehensive Inorganic Chemistry, Bailar et al editors, Pergamon Press (1975), p. 375.

*Primary Examiner*—Paul Lieberman
*Assistant Examiner*—Gregory R. Delcotto
*Attorney, Agent, or Firm*—Synnestvedt & Lechner

[57] ABSTRACT

A process for producing a ceramic material which is electrically conductive by reacting titanium dioxide with intercalated graphite under conditions which effect the reduction of the titanium dioxide, said product comprising an electrically conductive, corrosion-resistant, substoichiometric titanium dioxide combined chemically with an intercalant or residue thereof, for example, a metal such as copper or nickel, and the use thereof in thermal, electrical and electrochemical applications.

15 Claims, No Drawings

ELECTRICALLY-CONDUCTIVE TITANIUM SUBOXIDES

CROSS-REFERENCE TO RELATED APPLICATIONS

This is a divisional of Application Ser. No. 08/239,943, filed on May 9, 1994, which is a continuation of application Ser. No. 07/531,208, filed on May 30, 1990, now abandoned, which is a divisional of application Ser. No. 07/006,119, filed Jan. 23, 1987, now U.S. Pat. No. 4,931,213, issued on Jun. 5, 1990.

FIELD OF THE INVENTION

This invention relates to the provision of an electrically conductive material which has excellent corrosion-resistant properties. More particularly, this invention relates to an electrically conductive, corrosion-resistant form of titanium oxide and to a method for producing the same.

It has long been sought to synthesize a material which has the properties of both metals and ceramics. One of the principal characteristics of metals is that they are electrically conductive. Ceramics are characterized by their inertness, being highly resistant to chemical attack by water and other inorganic and organic materials, and to the effects of high temperature. However, ceramics are typically insulating materials, and accordingly, cannot be used effectively in applications where the transfer of electrical current is required. On the other hand, readily available, highly conductive metals are degraded readily by a variety of different types of chemicals, such degradation being accelerated and aggravated at elevated temperatures.

There are numerous applications which involve the transfer of electrical current in environments which are highly corrosive or otherwise degrading to metallic conductors. These include electrochemical electrical and thermal applications. Examples of such applications are the use of electrodes for chlorination, anodes for recovery of magnesium from seawater, electrodes in oxyhydrogen fuel cells, electrodes in electric arc furnaces and electrodes in hot phosphoric acid fuel cells. Most of these applications involve the contact of an electrode with an electrolyte under conditions which render the electrode ineffective during prolonged use. The loss of effectiveness can be gradual, such loss being manifested by reduced current-carrying capacity of the electrode. Exemplary types of conditions which render electrodes ineffective as they are used in current-carrying applications are described below.

One such condition involves chemical attack of the electrode by corrosive gas which is evolved from the electrolyte as it is decomposed during use. For example, the evolution of chlorine gas, a highly corrosive material, from an aqueous chloride-containing electrolyte is exemplary.

Another type of condition involves passivation of the electrode as it combines with oxygen which is evolved from the electrolyte as it is decomposed during use. The metal comprising the electrode reacts with the oxygen to form a non-conductive oxide barrier which diminishes the current-carrying capacity of the electrode. The evolution of oxygen gas from an aqueous sulfuric acid electrolyte is exemplary.

Another type of condition which renders electrodes ineffective involves the dissolution of the electrode by the electrolyte. The use of a copper anode in an aqueous copper sulfate solution is exemplary.

There are other electrically conductive applications which do not involve the use of electrolytes, but which, nevertheless, involve the exposure of the conductive material to conditions which tend to degrade, destroy or otherwise render the conductor ineffective. The use of electrodes in electric arc furnaces is an example of such an application.

Accordingly, it should be appreciated that a conductive material which is stable or inert when exposed to conditions of the type mentioned above would be an ideal material for use in a variety of applications which involve the transfer of electrical current.

Vitrified forms of titanium dioxide ($TiO_2$) which are ceramic in nature and which have excellent corrosion-resistant and erosion-resistant properties at room temperature, as well as at elevated temperature, are known. However, inasmuch as such forms of $TiO_2$ are electrically insulative, they cannot be used effectively as conductors in electrical applications. In this connection, it is noted that U.S. Pat. No. 2,369,266 discloses that a ceramic formed by virtrifying a material comprising chiefly $TiO_2$ is highly insulative in character, having a resistivity of about $1 \times 10^9$ megaohms-cm. The vitrifying conditions used for making this $TiO_2$—ceramic involve the use of a neutral or oxidizing atmosphere and a temperature of 1350°–1400° C.

It is known also that titanium dioxide can be converted into a different oxide form which is not only ceramic in nature, but also electrically conductive. Such prior art forms of titanium oxide can be represented by the formula $TiO_x$, wherein "x" has a value less than 2. Such forms of titanium oxide are referred to in the prior art as "substoichiometric titanium dioxide" or "titanium suboxide".

The present invention relates to improved electrically conductive, corrosion-resistant forms of substoichiometric titanium dioxide and to an improved method for preparing the same.

REPORTED DEVELOPMENTS

As far back as the 1920's, there was disclosed in British Patent No. 232,680 an electrically conductive form of titanium oxide prepared by reacting titanium dioxide in a neutral or reducing atmosphere, such as hydrogen, at temperatures substantially below the fusion point of the titanium dioxide. Temperatures within the range of 800°–1000° C. are mentioned specifically. This patent discloses also that it had been known previously to prepare electrically conductive forms of titanium oxide by either of the following methods: (A) the heating of $TiO_2$ in a neutral or non-oxidizing atmosphere until a black or grey-black form of titanium suboxide is formed, for example, heating $TiO_2$ in an electric arc furnace at temperatures of 2000°–3000° C.; or (B) the heating of $TiO_2$ in the presence of carbon and a reducing temperature of 1500°–2000° C. to form a dark-bluish form of a titanium suboxide.

The development described in U.S. Pat. No. 2,369,266 (1945) is directed also to means for converting $TiO_2$ to an electrical conductor by firing $TiO_2$ under conditions which convert chemically at least a portion of the $TiO_2$ into a conducting material. In one embodiment, powdered $TiO_2$ is formed into a desired shape and the shaped article is vitrified in a reducing atmosphere (CO and/or $H_2$) at a temperature in excess of 1000° C. In another embodiment, powdered $TiO_2$ is formed into the desired shape by firing first in a neutral or oxidizing atmosphere and then the shaped article is refired at a temperature in excess of 1000° C. in a reducing atmosphere. The patent discloses that the aforementioned reactions are effective in reducing at least a portion of the titanium dioxide to a form which is electrically conductive, and sufficiently so to impart conductive properties to the ceramic type article.

The aforementioned '266 patent discloses also that $TiO_2$ can be converted to an electrical conductor by adding thereto a conducting material and fabricating an article from the resulting mixture under conditions which result in the formation of a ceramic-like material. The following embodiments are disclosed: (A) $Ti_2O_3$ (a conductor) is mixed with $TiO_2$, the mixture is shaped, and then fired in a reducing atmosphere to prevent $Ti_2O_3$ from being oxidized; (B) an oxide of Cu, V or Cr or a compound of one of these oxides is mixed with $TiO_2$, the mixture is shaped, and then fired in a neutral or oxidizing atmosphere, the metallic oxide reacting with $TiO_2$ to form the titanate of the metal, V being the most effective; and (C) a titanate of Cu, V, or Cr is mixed with $TiO_2$, the mixture is shaped, and then fired in a neutral or oxidizing atmosphere.

The patent discloses that each of the basic processes disclosed therein can be used to produce a vitrified crystalline ceramic body that is conductive and has a resistivity below 1 megaohm-cm. According to the patent, such conductive, ceramic bodies can be used to excellent advantage in the textile industry as conductive thread guides which are capable of dissipating static charges of electricity and which have excellent abrasion-resistant properties.

British Patent No. 1,231,280 discloses a titantium electrode coated with an electrically conductive form of titanium suboxide that is prepared by treating solid ceramic samples of titanium dioxide in the form of rutile with hydrogen at elevated temperatures, for example, 450° C. to 1350° C. (see Breckenridge and Hosler, Research Paper 2344, National Bureau of Standards (U.S.), Vol. 49, No. 2, August 1952).

British Patent No. 1,438,462 discloses also an electrode comprising a metal such as titanium and coated with electrically conductive titanium oxide and at least one electrochemically-active substance, for example, platinum. The preferred conductive titanium oxide is described as $TiO_y$, with y being a number within the range of 0.1 to 1.999, preferably at least 1.75. $TiO_y$, with y being 1.9 to 1.999, is prepared by subjecting $TiO_2$ to the high temperatures of flame or plasma spraying as the oxide is deposited onto the metal base comprising the electrode. $TiO_y$ in which y is less than 1.9 is described as being prepared by subjecting $TiO_2$ to flame or plasma spraying in a reducing atmosphere or in the presence of powdered Ti metal, or by subjecting powdered Ti metal or a powdered higher suboxide to flame or plasma spraying.

U.S. Pat. No. 4,422,917 discloses a method for preparing electrically conductive, corrosion-resistant forms of $TiO_x$, with x being a number within the range of 1.55 to 1.95. This patent includes information which indicates that the electrical conductivity of such substoichiometric forms of titanium dioxide peaks when x is 1.75. Such conductive material, that is, $TiO_{1.75}$ or $Ti_4O_7$, is said to have an electrical resistivity of about $1000 \times 10^{-6}$ ohm-cm.

The means disclosed in the '917 patent for producing such forms of $TiO_x$ are like the means described in the aforementioned '266 patent. Thus, titanium dioxide in bulk form, such as $TiO_2$ powder or $TiO_2$ powder in compressed and shaped form, is reduced in hydrogen at temperatures in excess of 1000° C. for a period of time until the desired form of $TiO_x$ is produced. For example, reduction can be effected in four hours at a temperature of 1150° C.

The '917 patent discloses also that reducing agents other than hydrogen can be used. Examples of such reducing agents are titanium powder, TiN, $TiSi_2$, carbon, Si, TiO, and $Ti_2O_3$. The use of such other reducing agents involves the employment of a non-oxidizing atmosphere, for example, argon, nitrogen, or a vacuum heat treatment and of elevated temperatures, for example, 1200° to 1500° C.

One of the principal problems associated with the developments described in the aforementioned patents is that it is difficult to control the reaction in a manner such that there is produced consistently a product which has the relatively high conductivity that is desired. The leads to inefficiencies and increased costs. In addition, the conditions of reaction are relatively costly to maintain, with times being relatively long and/or temperatures relatively high.

There are several U.S. patents which disclose other substoichiometric forms of $TiO_2$, that is, forms of $TiO_x$ in which x is equal to 0.25 to 1.5. One of these patents is U.S. Pat. No. 4,029,566 which contains a substantial amount of information on how the electrical resistivity of $TiO_x$ varies depending on the specific value of x in the range of zero to 1.5. The '566 patent discloses that such forms of TiO can be made by reacting $TiO_2$ with Ti at elevated temperatures, for example, 1200°–1400° C., for several hours in an inert atmosphere, for example, argon. U.S. Pat. No. 4,252,629 is another publication which relates to forms of $TiO_x$ in which x is in the range of 0.25 to 1.5. It, like the aforementioned '566 patent, discloses the use of such forms of titanium oxide as an electrode base which is covered with a layer of conducting material.

Based on the disclosures of these patents, the substoichiometric forms of titanium dioxide disclosed therein are ceramic-like, as manifested by their corrosion-resistant properties, but they are not sufficiently conductive for effective use in many applications. Accordingly, for use in many electrically conductive applications, they must be combined with conductive materials, for example, coated with an electrically conductive metal.

The present invention relates to the provision of novel forms of electrically conductive, corrosion- and wear-resistant forms of substoichiometric titanium dioxide and also to a novel method for preparing such materials.

BRIEF DESCRIPTION OF THE INVENTION

In accordance with the present invention, there is provided a process for producing an electrical conductor which comprises forming an electrically conductive, ceramic product by reacting titanium dioxide with intercalated graphite under conditions which effect the reduction of the titanium dioxide.

Intercalated graphite, the essential reducing agent for use in the practice of the present invention, is a known material which can be described generally as graphite which has been modified chemically by introduction into the lamellar structure of the graphite of a material which modifies its conductive properties. The term "intercalant" is used herein, as it is used in the prior art, to refer to the material which is introduced into the intercalated graphite structure. Preferred intercalated graphite for use in the practice of the invention includes an intercalant comprising one or more of the following: chromium, copper, nickel, platinum, tantalum, zinc, magnesium, ruthenium, iridium, niobium and vanadium.

In preferred form, the conditions for reducing the titanium dioxide include the use of hydrogen.

The chemical treatment of titanium dioxide with intercalated graphite is believed to effect the chemical introduction of the intercalant or residue thereof into the molecular structure of the titanium suboxide. Such chemical introduction is believed to be at least in part responsible for improved properties associated with the electrically-conductive products of the present invention.

Accordingly, another aspect of the present invention comprises an electrically-conductive, corrosion-resistant material comprising substoichiometric titanium dioxide combined chemically with an intercalant or residue thereof, preferably a metal or metallic compound, particularly an intercalant comprising one of the aforementioned preferred metals. Such materials can be fabricated into articles which can be used effectively in a variety of different types of electrically conductive applications. A few examples of such articles include anodes, cathodes, and battery plates.

Some advantages that are afforded by the present invention are as follows. Species of the present invention have corrosion-resistant properties that are like those of a ceramic and unique conductive properties. For example, species of the present invention have a greater conductivity than either that of the intercalated graphite used in the reduction of the $TiO_2$ or of the titanium suboxides made according to prior means. As will be described more fully below, the product of the invention can be tailor-made to provide various and desired solid and/or powdery forms of the electrically conductive, corrosion-resistant material for use in electrochemical, electronic, and thermal applications, for example, in the form of electrodes, heaters, cathodic-protection anodes for bars for the reinforcement of concrete, and other articles.

There are processing advantages that are associated also with the present innvention. By way of background, it is noted that prior art means for the commercial production of powdered $TiO_x$ with x being in the range of 1.67–1.75 generally involve the use of temperatures of 1000° to 1250° C. and reaction times of 6 to 8 hours. It is known that such times can be reduced to about 4 hours by including graphite powder in the reducing medium. However, such use of graphite leads to the formation of a titanium suboxide powder that tends to agglomerate to a significant degree and that is no more conductive than a product made without the use of powdered graphite; furthermore, articles formed from such powder are porous to an undesirable degree. In contrast, the process of the present invention can be used to make the aforementioned suboxides in the aforementioned shorter reaction times and in a fine powder form that has a relatively low tendency to agglomerate, and that is more conductive than the aforementioned suboxides of the prior art and more conductive than the intercalated graphite used in the reaction. In addition, it is possible to fabricate from the powdered product of the present invention solid articles that are less porous than ones made from those suboxide powders prepared from a reaction which involves the use of "plain" graphite powder. For example, in one test series, a solid article made from suboxide powders produced by the "plain graphite" process had a porosity of 40% whereas one made from suboxide powders produced by the intercalated graphite process of the present invention had a porosity of less than 5%.

The process of the present invention can be used to form very fine suboxide powders (for example, particle sizes below about 100 microns) which have significantly better anti-agglomerating properties than prior art suboxide powders. Thus, economic advantages can be realized because the heavy pulverizing or grinding steps associated with agglomerated powder of the prior art can be avoided. Also, such fine powders can be fabricated more efficiently and economically into various types of solid article, including large-size articles, by a hot press or isostatic press technique that does not require the use of binders and high temperatures. In contrast, the larger-size suboxide powders of the prior art are difficult, if not impossible, to fabricate without the use of insulative binders and sintering in a hot isostatic press or an over-pressure furnace. Other advantages of the present invention are mentioned hereafter in connection with the detailed description of the invention.

DETAILED DESCRIPTION OF THE INVENTION

The essential elements needed for the practice of the present invention are titanium dioxide, intercalated graphite, and the presence of these materials in an atmosphere that is effective in reducing titanium of valence four.

Any form of titanium dioxide that is capable of being reduced in the presence of intercalated graphite can be used in the practice of the present invention. The valence of titanium in $TiO_2$ is 4, titanium IV being the most stable and common oxidation state of this element.

Titanium dioxide is found in nature in three crystalline forms, namely rutile, anatase and brookite, the first two mentioned forms being tetragonal and the last mentioned form being rhombohedral. Although each of these crystalline forms can be used in the practice of the invention, it is believed that the crystalline form used most widely will be rutile, the most plentiful form of titanium dioxide. The present invention can be practiced using pigment grade $TiO_2$; however, it is preferred that more highly purified $TiO_2$ be used, for example, materials having a $TiO_2$ concentration of at least about 99.5 wt. %. Titanium dioxide powders having a submicron particle size are available commercially. Such powders tend to agglomerate; the agglomerated form of the powders can be used in the practice of the present invention.

As will be described in more detail below, the titanium dioxide which is subjected to reduction according to the present invention can be in powdery form or in the form of a solid mass comprising compressed titanium dioxide particles or powder intermixed with the intercalated graphite. In the first instance, it is preferred that the average particle size of the $TiO_2$ powder be about 10 to about 50 microns. In the case of using particles of $TiO_2$ to form an article which is then subjected to the reducing reaction, it is preferred that the average particle size of the $TiO_2$ powder be about 1 to about 20 microns. In general, it is preferred that the average particle sizes of the titanium dioxide and the intercalated graphite be in the same or similar range.

With respect to the other essential reactant for use in the practice of the present invention, there can be used any intercalated graphite that is effective in reducing $TiO_2$ to a suboxide form and that is capable of introducing chemically into the suboxide molecule intercalant in an amount sufficient to improve the electrical conductance of the suboxide or impart thereto electrically conductive properties. As mentioned briefly above, intercalated graphite is a known synthetic material which is made by chemically affixing into the graphite structure a material which improves the electrically conductive properties of the graphite. By way of background, it is noted that graphite comprises planes or layers of bound carbon atoms. It is reported in the literature that intercalation of graphite involves the insertion into the region between such planes or layers of a material that is bound chemically thereto and that modifies the properties of the graphite, including its conductive properties by reducing the electrical restivity of the graphite. The intercalant can function also to increase the thermal conductivity of the graphite, to improve the workability of the graphite, and to render the graphite more resistant to oxidation.

The art discloses many types of intercalating agents that can be reacted with graphite to introduce an intercalant into its interstitial structure. Exemplary classes of such intercalating agents are: halide salts, for example, halides of transition elements, Group III A elements and Group IV A, V A and VI A elements and metaloids; a metal halide and a Bronsted acid, that is, any compound capable of donating a proton and making an acidic solution in water for example, hydrogen halides; and a strong oxidizing agent, for example, certain mineral acids.

Specific examples of intercalating agents include: $CrO_2Cl_2$, $CrCl_3$, $CrO_3$, $CrO_2F_2$, $SbF_5$, $SbCl_5$, $Br_2$, $VF_5$, $FeCl_3$, $FeCl_5$, $CuCl_2$, $PtCl_4$, $PtF_4$, $NiCl_2$, $AuCl_3$, $RuCl_3$, $BiF_5$, $SO_3$, $ICl$, $IrCl_3$, $InC_{13}$, $TaCl_5$, $TaF_5$, $SmCl_3$, $ZrF_4$, $ZrCl_4$, $UCl_4$, $YCl_3$, $NbF_5$, $BF_3$, $SiF_4$, $HfF_4$, $TiF_4$, $AsF_5$, $HCl$, $HF$, $HBr$, $H_2SO_4$, $HNO_3$, $HNO_2$, $HClO_4$, $HClO_3$, $HIO_4$, $HIO_3$, $HBrO_4$, and $HBrO_3$. It is known to introduce two or more intercalants into the graphite structure by treating graphite with a mixture of two or more intercalating agents. Such intercalated graphite which comprises two or more intercalants can be used in the practice of the present invention.

Examples of patents that disclose intercalated graphites and methods for preparing the same are U.S. Pat. Nos: 3,409,563; 3,956,194; 3,962,133; 4,052,539; 4,110,252; 4,119,655; 4,293,450; 4,414,142; 4,477,374; 4,496,530; 4,511,493; 4,515,709; and 4,565,649. Speaking generally, and by way of example, a prior art method for preparing intercalated graphite involves the provision of an intercalating agent, for example, a compound comprising a metal cation and an anion, for example, one that vaporizes under calcining conditions, and the formulation of a solution comprising the intercalating agent and a solvent therefore, including aqueous, non-aqueous, and aqueous/organic solvents. The solution of intercalating agent is used to impregnate the graphite host, typically in powdered form. Thereafter, the impregnated graphite is dried to remove the solvent and the dried material is subjected to hydrogen at an elevated temperature, for example, in excess of 400° C. to reduce the metal cation to its corresponding metal of zero valence. The intercalated graphite is recovered in powdered form. Another exemplary prior art method involves treating graphite powder at an elevated temperature with a gaseous form of the intercalating agent.

As described in more detail below, the intercalated graphite for use in reducing titanium dioxide according to the present invention can be in powdery form or in the form of a solid mass comprising a compressed mixture of intercalated graphite and titanium dioxide powders. When working with a powdery mixture of the reactants, it is preferred that the particle size of the intercalated graphite be about 5 to about 40 microns. On the other hand, when the reactants are in the form of a solid mass of compressed particles, it is preferred that the particle size of the intercalated graphite be about 5 to about 60 microns.

The relative proportion of intercalant comprising the intercalated graphite can vary over a wide range. For example, the intercalant can comprise about 5 to about 20 wt. % of the intercalated graphite. Preferably, it comprises about 6 to about 10 wt. % of the intercalated graphite.

It is believed that the forms of intercalated graphite that will be used most widely in the practice of the present invention are those which introduce chemically into the molecular structure of the titanium suboxide an intercalant which functions to impart highly conductive and corrosion-resistant properties to the graphite. For use in an application involving a particular electrochemical reaction, the intercalating agent should be selected so that the intercalant is non-polluting to the reaction. For use in applications involving a heating element, the intercalant should be a material which exhibits particularly good resistance to oxidation, including at high temperatures. Intercalants which it is expected will be used widely include chromium, copper, nickel, platinum, tin and tantalum. Preferred intercalating agents are metal halides, including particularly halides of the aforementioned metals.

Intercalated graphite is available commercially in a number of different forms, including, for example, in the form of powders which vary in particle size and in the form of chopped fiber. For exemplary purposes, it is noted that some of the commercially available powdery forms of intercalated graphite have a specific gravity within the range of about 2.4 to about 2.6 and an average particle size within the range of about 5 to about 200 microns. Intercalated graphites sold under the trademark INTERCAL have been used effectively in the practice of present invention.

Intercalated graphite is in and of itself effective in reducing titanium dioxide to substoichiometric forms thereof, and accordingly, intercalated graphite can be used by itself to reduce titanium dioxide in a neutral or non-oxidizing environment. In addition, the present invention contemplates the use of one or more other reducing agents in combination with the intercalated graphite. Any material which is effective as a reducing agent in combination with the intercalated graphite can be used, examples of such materials being hydrogen, nitrogen and forming gas (a mixture of nitrogen and hydrogen). The use of hydrogen is preferred.

Advantages that can be realized by the use of a mixture of reducing agents are that times of reactions can be reduced and the ability to control the level of reduction of the oxide is facilitated.

Particularly good results have been achieved utilizing gaseous hydrogen in combination with intercalated graphite in that uniform reductions are achieved in economically short times.

There follows hereafter a description of the formulation of the reactive mixture which is used to prepare the titanium suboxide of the present invention and the conditions of reaction.

In one embodiment of the present invention, the reactive mixture is prepared by admixing powdery forms of each of the titanium dioxide and intercalated graphite reactants. The relative amounts of reactants comprising the mixture can vary over a wide range. In general, the mixture will comprise a major amount of titanium dioxide and a minor amount of intercalated graphite, for example, about 5 to about 40 wt.% of the intercalated graphite and about 60 to about 95 wt.% of titanium dioxide.

The powdery mixture is reacted at an elevated temperature and for a sufficient period of time until the desired degree of reduction of the titanium dioxide is achieved and the desired amount of intercalant is introduced into the structure of the titanium suboxide. The reaction can be carried out at atmospheric pressure or at elevated pressure. At the elevated temperature of reaction, the titanium dioxide and intercalated graphite are in a plastic-like form. In general, the higher the temperature and pressure, the shorter the time required for the reaction. Exemplary conditions include a time of reaction of at least about 1 hour and a temperature of at least about 1000° C., with temperatures and times falling typically within the range of about 1.5 to about 6 hours and about 1000° to about 1375° C. Typical pressures fall within the range of about 1.2 to about 4 atmospheres. Preferred conditions of reaction involve about two to about 3 hours of reaction time at about 1200° to about 1300° C.

The intercalated graphite is consumed during the reaction and it appears that a metal intercalant is converted to a metal oxide as the metal functions as a reductant during the reaction, with the metal oxide being chemically incorporated into the titanium suboxide.

The powdered substoichiometric titanium dioxide can itself be used in conducting applications or it can be fabricated into an electrically conductive article of desired shape, for example, plates, rods, tubes, or articles of a more complicated shape. The fabrication of such articles can be accomplished by using known methods such as, for example, injection molding, slip casting, isostatic pressing, and extrusion. Conventional equipment can be used, including, for example, an isostactic press, hydraulic press and injection molding and extrusion apparatus. The conductive powder can also be wet- or dry-pressed into the desired shape.

It has been mentioned above that one of the advantages of the present invention is that the powdered, intercalated titanium suboxide has exceptionally good workable properties. Such properties manifest themselves with the relative ease with which the powders of the present invention can be compressed into forms having a relatively high green strength. Good green strength permits the compressed form to resist damage as it is handled during the process steps which precede the sintering, vitrification or curing of the formed article to convert it into strong, dense solid mass. It has been observed that it is possible to initially form various species of such articles without having to use binders or binding aids of the type required for use in forming articles from prior art powders. It should be understood, however, that such binders and binding aids may be used if desired, and for some shapes, they may be required.

After the titanium suboxide powder has been formed into the desired shape, it can be subjected to elevated temperatures in a neutral atmosphere (for example, in argon) to convert the compressed particles into a solid, higher density, ceramic-type mass having high tensile strength. Thus, the formed powdery mass can be sintered, for example, at temperatures of about 1300° to about 1400° C. for or about ½ to about 2 hours. If binders are used in forming the article, the shaped mass can be cured under less severe conditions, for example, at temperatures of about 100° to about 135° C. for about 6 to about 12 hours. In either case, the sintering or curing operation should be carried out in a non-oxidizing atmosphere to keep the titanium suboxide from being oxidized.

Instead of subjecting the unshaped powdery mixture of reactants to a reducing atmosphere, as described in the embodiment above, the present invention can also be practiced by initially forming the powdery mixture of reactants into the desired shape and then subjecting the shaped form of the mixture to the reducing medium. The conditions of the reaction can be selected so that during the reaction, the shaped mixture is converted to a hard, solid, dense mass by sintering as mentioned above. A preferred embodiment of the present invention comprises subjecting the reactants to a temperature at which the titanium dioxide is reduced, but at which there is incomplete sintering of the reactants. Thus, reduction is effected while the reactive mass is still porous. After the desired reduction is effected, the temperature of the mass can be raised to complete the sintering thereof.

Shaping and compressing techniques as described above can be used in connection with forming the article in accordance with this alternative procedure for fabricating articles in accordance with the present invention.

Based on preliminary observations and analyses, the following is offered as an explanation of the manner in which the product of the present invention is formed, the nature of the product and the reason for its unique properties. Under the conditions of reaction, the valence of titanium is reduced from 4 to a lower value, for example, to a value in excess of 2 as carbon comprising the graphite is substantially converted to an oxidized by-product of the reaction. On the other hand, intercalant of the intercalated graphite reacts with the titanium oxide reactant and becomes part of the structure thereof. For example, when using an intercalant comprising a metal, it is believed that the metal may be present in various forms in the suboxide, for example, in uncombined form or in combined form such as an oxide of the metal or combined with an anion comprising the intercalant. The term "residue" is used herein to refer to that form of material which is derived from the intercalant and which is affixed in the suboxide in a form other than the form that it is present in the intercalant.

It appears that the mere presence of the intercalant or its residue in the titanium suboxide is sufficient to improve its conductive properties over and above those of suboxides of the prior art, including those prior art forms of $TiO_x$ having an x above or below 1.65 or above or below 1.55. There has been produced in accordance with the present invention product in which x is below 1.5 and which has significantly better conductive properties than those of a corresponding prior art suboxide. Although there are applications in which there can be used product of the present invention having a resistivity of no greater than about 2 ohm-cm, it is believed that there will be much wider use of product having a significantly lower resistivity such as, for example, $1.8 \times 10^{-4}$ ohm-cm and lower. For such applications, it is recommended that x for the suboxide be greater than about 1.1.

The material combined with the titanium oxide during the course of the reduction of titanium dioxide pursuant to the present invention is referred to herein and in the claims variously as "intercalant", "reside thereof" and "metal". It should be understood that such terms refer to and define a material that is not present in the titanium dioxide being treated, for example, inherently as part of its structure or as an impurity.

Examples of applications in which the product of the present invention can be used are the following: (A) as a magnetic coating formed from the powdered form of a chromium-titanium suboxide for video and audio tapes; (B) as a solid ceramic electrode for electrochorination, for example, for use in controlling bacteria in swimming pools and water cooling towers; (C) as a solid ceramic anode comprising a magnesium-titanium suboxide for recovery of magnesium from seawater; (D) as a heating element, including use at temperatures of 300° C. and higher, particularly in corrosive environments; (E) as a non-corroding, ground bed electrode; (F) as a non-corroding electrode for cathodic protection of steel-reinforcing bars in concrete structures such as highways, bridge decks and bridge supports, particularly those adjacent salt water; (G) as an oxidation-resistant electrode in oxy-hydrogen fuel cells; (H) as an electrode in hot phosphoric acid fuel cells; (I) as a starter electrode for arc furnaces and other heating applications in combination with zirconium oxide as the high temperature electrode component (the material can be recycled for indefinite use); (J) as an electrode in various types of batteries, including, for example, automobile and industrial batteries; (K) as a corrosion-resistant electrode for an electrostatic precipitator; (L) as a starter electrode in a hot zirconium oxide fuel cell; (M) as an electrostatic blood filter and in other bio-ceramic applications where body rejection might be a problem; and (N) as a material in place of steel or tungsten carbide for electron discharge machining of tools, particularly for powdered metallurgy, pharmaceutical and ceramic pressing tools. Speaking generally, the product of the present invention can be used in any electrochemical reaction.

As mentioned briefly above, the product of the present invention can be tailor-made for certain applications. For example, an anode comprising a titanium suboxide which includes a copper intercalant is particularly suited for use in electrolytically separating copper from a copper-containing ore, that is, electrowinning of copper. In such an application, the copper intercalant which is present on the surface of the suboxide is apt to enter the electrolyte used in the electrowinning process, but in so doing, it does not contaminate the electrolyte. In effect, such an anode is a "non-polluting" anode. Similarly, ruthenium- or tantalum-titanium suboxides can be used as electrodes in generating chlorine and platinum-titanium suboxides can be used as non-polluting anodes in fuel cells or batteries. If desired electrodes comprising the present invention can be plated, for example, by electroplating, with other metals.

EXAMPLES

The following examples are illustrative of the practice of the present invention.

Example No. 1

This example involves the reduction of titanium dioxide with a chromium-containing, intercalated graphite.

The source of the titanium dioxide is rutile which has a purity in excess of 99.5 wt. % and is in the form of fine particles, with less than 0.01% being retained on 325 mesh, U.S. Sieve Series.

The chromium-containing, intercalated graphite is indentified by its manufacturer, Intercal Company, as having a formula of $C_{17.6}CrCl_3$ and a specific gravity of 2.509 g/cm$^3$.

Five kilograms of TiO$_2$ powder and 0.75 kg of the intercalated graphite are mixed in a V-blender for ½ hour to provide a uniform mixture of the powders. The mixture is placed in a reduction furnace where it is held at a temperature of about 1250° C. for 2 hours with the partial pressure of oxygen in the furnace being maintained at $10^{-10}$ to $10^{-14}$ ppm.

The reduced powdered mixture has a black appearance. In general, grinding is needed to meet particle requirements.

An example of an application for this conductive ceramic is a pigment for conductive paint.

Example No. 2

This example involves the reduction of a ceramic grade titanium dioxide with copper chloride-intercalated graphite and hydrogen.

The titanium dioxide is the same as described in Example No. 1. The copper chloride-intercalated graphite is identified by its manufacturer, Intercal Company, as having a formula $C_{14.5}CuCl_2$, a bulk density of 0.18 g/cm$^3$, a specific gravity of 2.57 g/cm$^3$, an average particle size of 5 microns, and an analysis referred to by its manufacturer as being based on preliminary data of: carbon—56.4 wt. %, copper—20.6 wt. %; chlorine—23.0 wt. %; and ash—less than 0.5 wt. %.

Twenty kilograms of the TiO$_2$ powder and 1.6 kg of the graphite are mixed in a V-blender for 0.5–1 hour to provide a uniform mixture of the powders. About 400 g of the mixture is formed into a rod in an isostatic press which is used to apply a forming pressure of about 20,000 psi to the mixture. One of the advantages of using graphite intercalated with a metal chloride is that the metal chloride functions as a binder and the graphite functions as a lubricant in forming an article such as a tile, tube, or rod. Accordingly, it is not necessary to use a binder or additives in order to hold together the formed and compressed powdered mixture of the part.

After the rod is formed, it is placed in a furnace where it is held at a temperature of 1250° C. for 3 hours. With a constantly varying hydrogen flow through the furnace of between 10 and 20 liters/min, the atmosphere is highly reducing.

As the rod is withdrawn from the furnace, it is observed to have a blue/black appearance. The electrical conductivity is uniform throughout the thickness of the part.

The next example illustrates the preparation of an electrically conductive, ceramic plate.

Example No. 3

The plate of this example is formed from the type of titanium dioxide powder and copper chloride-intercalated graphite identified in Example No. 2 above.

Following the mixing steps described in Example No. 1, 10 kg of a mixture comprised of 90 wt. % TiO$_2$ powder and 10 wt. % of copper chloride-intercalated graphite are placed in a furnace and subjected to a temperature of 1250° C. for approximately 2 hours and a reducing atmosphere which includes a hydrogen flow of approximately 10 liters/min. The cooled titanium suboxide powder that is the product of the reaction has a blue/black appearance.

Five hundred grams of the suboxide powder are mixed with 10 g of methylcellulose, an organic binder. The resulting mixture is then molded into a plate having dimensions of 28 cm×28 cm×5 mm in a ram press utilizing a pressure of 3000 psi. The plate is then vitrified in a non-oxidizing atmosphere to inhibit oxidation of the suboxide form of titanium. Vitrification is effected at a temperature of 1250° C. for ½ hour. The plate is then ready for use.

The electrically-conductive, ceramic-type plate can be used as an anode or cathode in any electrochemical application.

The next example illustrates the preparation of a rod utilizing a multi-stage reducing process.

Example No. 4

The rods of this example are formed in the same way as in Example No. 2 by mixing and isostatic pressing. They are formed from the titanium dioxide powder and copper chloride intercalated graphite identified in Example No. 2.

The rods are then fired in a high temperature furnace to a temperature of 1250° C. for 4 hours. This is done at a heating and cooling rate of 100 degrees per hour.

The fired rods are finally reduced in the same way as in Example No. 2.

The final products have high density and strength. The electrical conductivity of the multi-stage fired pieces is much higher than that of either $TiO_x$ without intercalated graphite or the pieces described in Example Nos. 2 and 3 with the same amount of intercalated metal elements.

In summary, it can be said that the present invention provides a unique composition which can be used to excellent advantage in many different types of applications and that it encompasses the provision of an efficient process for preparing the unique composition.

I claim:

1. A powdered, electrically conductive corrosion-resistant uniform material in shaped form comprising substoichiometric titanium dioxide combined chemically with a graphite intercalant or residue thereof, said intercalant or residue comprising a metal selected from the group consisting of chromium, copper, nickel, platinum, tin, tantalum, zinc, magnesium, ruthenium, iridium, niobium, vanadium, and a mixture of two or more of said metals, said material having a resistivity of no greater than about 2 ohm-cm throughout the thickness of the composition, wherein the metal is distributed within the molecular structure of the substoichiometric titanium dioxide in chemically combined form.

2. An electrically conductive, corrosion-resistant sintered article of claim 1.

3. An electrode comprising the sintered article of claim 2.

4. An electrochemical apparatus comprising means for recovering magnesium from sea water and including an electrode of claim 3 in the form of an anode, said metal of said anode comprising magnesium.

5. An electrochemical apparatus comprising means for separating copper from a copper-containing ore and including an electrode of claim 3 in the form of an anode, said metal of said anode comprising copper.

6. A fuel cell or battery including the electrode of claim 3.

7. The electrically conductive, corrosion-resistant sintered ceramic article of claim 2 wherein said article is a ceramic comprising substoichiometric titanium dioxide ($TiO_x$), the valence of the titanium being below 4, but in excess of 2, and x being below 1.5.

8. The ceramic article of claim 7 wherein x is greater than about 1.1 and wherein the resistivity of the ceramic is no greater than $1.8 \times 10^{-4}$ ohm-cm.

9. The ceramic article of claim 7 prepared by reacting titanium dioxide with intercalated graphite under conditions which effect the reduction of the titanium.

10. The ceramic article of claim 7 wherein said metal is selected from the group consisting of chromium, copper, nickel, platinum, niobium, tantalum, and tin.

11. The ceramic article of claim 8 wherein said metal is selected from the group consisting of chromium, copper, nickel, platinum, tin, tantalum and niobium.

12. The electrically conductive, corrosion-resistant shaped uniform material of claim 1 having resistivity of no greater than $1.8 \times 10^{-4}$ ohm-cm.

13. The material of claim 12 wherein the substoichiometric titanium dioxide is represented by the formula $TiO_x$ and wherein x of said formula is greater than about 1.1.

14. The material of claim 12 wherein said metal is selected from the group consisting of chromium, copper, nickel, platinum, tin and tantalum.

15. The material of claim 13 wherein said metal is selected from the group consisting of chromium, copper, nickel, platinum, tin and tantalum.

* * * * *